2,703,765

SALICYLIC ACID CURED COATING COMPOSITION COMPRISING AN EPOXY POLYHYDROXY POLYETHER RESIN AND AN AMINE-ALDEHYDE RESIN

Le Verne Kenneth Osdal, Springfield, Pa., assignor to E. I. du Pont de Nemours and Company, Wilmington, Del., a corporation of Delaware No Drawing. Application January 15, 1953, Serial No. 331,505

14 Claims. (Cl. 117—75)

This invention relates to improved alkali-resistant coating compositions and process of making same.

Finishes used on domestic laundry equipment are subject to considerable abuse in the form of moisture, relatively high temperatures and contact with alkaline materials and detergents. Coating compositions suitable for the protection of such equipment must be adequately resistant to moisture, hot water, soaps and chemical detergents. In addition, the finish must adhere strongly to the substrate and exhibit shock resistance, color retention and freedom from staining. Finishes meeting these requirements are generally necessarily cured at high temperatures of the order of 400° F. and are generally identified as high bake finishes.

Present day pattern of living has caused the family washing machine to be moved from the basement to the kitchen or first floor utility room. The new location has altered the specifications for the finish used to protect the metal surface. In addition to being durable and highly protective under severe service conditions, the finish must be decorative and preferably match the quality of the finishes used on the refrigerator, stove, sink and metal cabinets.

These requirements have been best met with coating compositions comprised of either a urea-formaldehyde resin/alkyd resin combination or melamine-formaldehyde resin/alkyd resin combination applied over a soap resistant primer composition, comprising, e. g., an esterifiable epoxy polyhydroxy polyether resin and a heat reactive amine/aldehyde resin. Maximum resistance is obtained when the prior art heat-reactive primer composition is cured at a temperature of about 400° F. for a period of 10 to 20 minutes. The primer is preferably cured at the said high temperature, but the topcoat may be cured at a lower temperature, such as 250 or 300° F. However, the curing cycle at the lower temperature is significantly longer and may range from 30 to 60 minutes and longer at these lower temperatures.

Substitution of an epoxy polyether resin derived from condensation of a bis-phenol with a halo-hydrin for the alkyd resin in high bake coating compositions produced an improvement in chemical resistance, particularly soap and alkali-resistance of the resulting cured finish. Curing at a temperature of about 400° F. was necessary to obtain optimum resistance of the finish.

Curing at high temperatures such as 400° F. is a more expensive operation than baking at more moderate temperatures in the range of 250 to 325° F., even though a longer time is required for the lower temperature. Quite often multiplicity of baking equipment is provided for curing the primer at high temperatures and the topcoats at moderate temperatures. Agents which accelerate the curing of compositions at moderate temperatures without sacrifice in quality obtained by high temperature curing are constantly being sought.

It is an object of this invention to provide an improved coating composition containing a curing agent whereby the curing temperature is significantly reduced. Another object is to provide a heat-reactive coating composition which adequately cures in the temperature range of 250 to 325° F. A further object is to provide a finish, cured at a moderate temperature, which exhibits superior soap and alkali-resistance, a characteristic pertinent to the protection of washing machines, and similar equipment. Still another object is to provide a hard tough finish capable of withstanding severe service conditions requiring a high order of moisture-resistance, alkali-resistance, adhesion, tensile strength and flexibility. Another object is to provide a method for curing thermosetting coating compositions at moderate temperatures to provide soap and alkali-resistant finishes.

These and other objects, as will be apparent hereinafter, are accomplished by accelerating the cure of a heat-reactive coating composition comprised of an epoxy polyhydroxy polyether resin and an amine-formaldehyde resin by the addition of a substituted benzoic acid curing agent, such as, e. g. salicylic acid, 5-chloro salicylic acid or acetyl salicylic acid and mixtures thereof, applying the composition to a metal substrate and heating to not less than 250° F. for at least 15 minutes to cure the composition.

It is known to the coating art that esterifiable epoxy polyether resins may be cured by crosslinking through the use of polyfunctional reactants capable of reacting with epoxy and hydroxyl groups. Polyamines and polycarboxylic acids of the aliphatic type have been particularly recommended for curing epoxy polyether resins. Polyfunctional reactants having various combinations of hydroxyl, carboxyl and amino groups have been disclosed as useful agents for crosslinking the reactive groups of the epoxy polyether resins. U. S. Patent 2,569,920 discloses a selected group of acids that crosslink epoxy polyether resins by esterification to provide a coating composition which is chemically resistant and exhibits unusual retention of adhesion to glass under service conditions. The severity of service conditions in the case of washing machine finishes is much greater than that of a glass article which is occasionally washed.

The use of acids and acid-reacting material to promote the cure of urea-formaldehyde resin is also well known. Phosphoric acid and partial esters of phosphoric acid are among the better known curing agents for this purpose. Hydroxy-carboxylic acids of the aliphatic and aromatic types are also known to accelerate the condensation, but no distinction has been made between isomeric forms, such as meta-hydroxy, parahydroxy and ortho-hydroxy benzoic acids.

The novelty of this invention resides in the unexpected discovery that salicylic acid, 5-chloro salicylic acid or acetyl salicylic acid are the only curing agents found to cure the combination of esterifiable epoxy polyether resins and amine/aldehyde resins at a moderate temperature and yet provide a finish having chemical resistivity equivalent to the coating cured at a temperature of at least 400° F. in the absence of a curing agent.

The following examples represent the preferred embodiments of the invention.

EXAMPLE I

| | Parts by wt. |
|---|---:|
| Epoxy polyhydroxy polyether resin solution—40% solids in 50/50 xylol and diacetone alcohol | 61.7 |
| Butylated urea-formaldehyde resin solution—60% solids in butyl alcohol | 8.4 |
| Titanium dioxide pigment | 14.9 |
| Diacetone alcohol | 7.5 |
| Xylol | 7.5 |
| | 100.0 |
| Salicyclic acid | 1.5 |
| | 101.5 |

The epoxy polyether resin is a condensation product of 2,2',diphenylol propane and epichlorohydrin, the resulting product having reactive hydroxyl and epoxide groups. The esterification equivalency of the resin is about 190, that is, one molecular weight of a monocarboxylic acid expressed in grams reacts with 190 grams of the resin. The resin is further characterized by an epoxide equivalency in the range of 1600 to 1900, thas it, this weight of resin expressed in grams provides one equivalent of epoxide expressed in grams. The resin has a melting point of about 130° C. as measured by the Durrans' mercury method.

The butylated urea-formaldehyde resin was of the type described in U. S. Patent 2,191,957.

The coating composition was applied to Bonderized steel panels to provide a film thickness of .6 to .7 of a mil. Application was by spray, but other methods such as dipping and roller coating may be substituted. The primer was cured for 30 minutes at 300° F. and top-coated with the following coating composition to provide an additional film thickness of about 1.2 to 1.3 mils.

*Washing machine top-coat composition*

| | Parts by wt. |
|---|---|
| Melamine-formaldehyde resin—50% solids in solvent consisting of 80% butyl alcohol and 20% xylol | 28.0 |
| Coconut oil modified alkyd resin—60% solids in xylol | 35.0 |
| Titanium dioxide pigment | 31.5 |
| Wax dispersion | .2 |
| Toluol | 4.3 |
| Butyl alcohol | 1.0 |
| | 100.0 |

The alkyd resin was a medium oil length coconut oil modified glyceryl phthalate alkyd resin of low acid number at 60% solids in xylol.

The wax dispersion was the product resulting from ball mill dispersing 15 parts of candelilla wax with 1.5 parts of butylated urea-formaldehyde resin in 70 parts in butyl alcohol.

The above top-coat composition, applied over the primer, was baked 30 minutes at 300° F. The finish exhibited physical properties highly desirable for protection and decoration of domestic laundry equipment. The two coat finish showed an unexpected maximum "soap life" of 83 days.

"Soap life" of the finish was measured by immersing a panel with the cured finish over Bonderized steel in an aqueous soap solution at 162° F., said solution consisting of 1½% "Gold Dust" washing compound in water, and noting the number of days the panel was immersed in soap solution until the degree of failure by blistering reached a rating of 7, which is recognized by the industry as an average passing mark for blister-resistance. A rating of 10 is perfect and a rating of 0 represents complete separation or removal of the coating from the substrate. Ratings between 10 and 0 represent intermediate degrees of alkali-resistance, as determined by the amount of blistering. At the 7 rating the blistering may be in the form of either dense fine blistering with general distribution, slight medium blistering with general distribution or considerable medium blistering with spotty distribution.

The term "soap life" as used throughout the specification and claims is used to denote the number of days a finish on a metal substrate can be immersed in a 1½% aqueous solution of "Gold Dust" at 160° F. before reaching a rating of 7 on the above mentioned scale, with respect to blistering.

A Bonderized steel panel was finished as per Example I, except the salicylic acid was omitted in the primer. The maximum "soap life" of the finish was found to be in the range of 12 to 20 days when cured at 300° F. for 30 minutes. However, when a curing cycle of 15 minutes at 400° F. was used with the primer containing no salicylic acid, the maximum "soap life" was found to be 83 days. These results show that 5 parts of salicylic acid based on 100 parts of resin solids promotes curing of the vehicle at a temperature of 300° F. for a period of 30 minutes equivalent to curing at 400° F. for a period of 15 minutes in the absence of a curing agent.

EXAMPLE II

The primer and top-coat compositions were identical with those of Example I, but acetyl salicylic acid was substituted for the salicylic acid in the primer. The "soap life" was 77 days.

EXAMPLE III

The primer and top-coat compositions were the same as those in Example I, except 5-chloro salicylic acid was substituted for salicylic acid in the primer. The maximum "soap life" was 85 days.

Position isomers of salicylic acid, that is, metahydroxy benzoic acid and parahydroxy benzoic acid, were found not to promote significant improvement in the cure of the finish. Other polyfunctional chemical compounds having combinations of amino, hydroxyl and carboxyl groups capable of reacting with hydroxyl and epoxide groups likewise did not promote curing at moderate temperatures to provide outstanding blister-resistance in soap solution.

Use of conventional polyfunctional cross-linking agents for epoxy polyhydroxy polyether resins accelerates the cure to provide a finish having improved soap and alkali resistance in comparison with the same finish cured at the same temperature without the aid of a catalyst. As indicated in the table below, the best "soap life" for finishes cured at 300° F. for 30 minutes using curing agents other than those employed in Examples I, II and III was found to be 52 days. Finishes cured at 300° F. for 30 minutes in accordance with this invention were found to have a "soap life" of 77 days and longer. Amine/aldehyde resins crosslink epoxy polyhydroxy polyether resins but, within the scope of this invention, they are not considered to be curing agents for accelerating the cure of the finish.

Various polyfunctional curing agents were substituted for the benzoic acid in the primer of Example I, and the compositions tested as described in Example I, using the same top-coat. The results of the "soap life" test of Examples I, II and III, as well as the finishes using the various polyfunctional compounds as the curing agents, are as follows:

| Curing Agent—Finish Cured at 300° F. for 30 Minutes | "Soap Life" at 160° F. to reach a Rating of 7 |
|---|---|
| | *Days* |
| Salicylic acid—Example I | 83 |
| Acetyl salicylic acid—Example II | 77 |
| 5-Chloro salicylic acid—Example III | 85 |
| o-Amino benzoic acid | 52 |
| Phthalic acid | 48 |
| m-Hydroxy benzoic acid | 24 |
| p-Hydroxy benzoic acid | 24 |
| p-Amino phenol | 24 |
| p-Amino benzoic acid | 17 |
| o-Amino phenol | 20 |
| Gallic acid (trihydroxy benzoic) | 40 |
| Pyrogallic acid (trihydroxy benzene) | 52 |
| Ethylene diamine | 52 |
| Octyl acid phosphate | 52 |
| Ortho phosphoric acid | 41 |
| Phenol | 26 |
| Resorcinol | 26 |
| Mono-Cellosolve citrate | 49 |
| Citric acid | 7 |
| Oxalic acid | 1 |
| 3,3-Imino bis propyl amine | 31 |
| Triethyl tetramine | 21 |
| No catalyst—control | 12–20 |

In most instances alkaline and soap compositions readily saponify the top-coat film and cause easy removal of the film from the primer within about 20 days' immersion in soap solution. The above "soap life" data disregard this saponification of the top-coat and pertains to failure of the primer. Tests made with and without a top-coat applied over the primer produced essentially the same value for maximum "soap life."

When the curing agent was omitted from the primer of Example I and applied to a Bonderized steel panel, followed by the same top-coat as Example I, a curing temperature of 400° F. for at least 15 minutes was required for the primer to obtain a "soap life" comparable to that of Example I.

Apparently the superior behavior of salicylic acid and substituted salicylic acid as indicated in the table is due to the carboxyl group having a reactive hydroxyl group ortho to it. Soap resistance decreased approximately 40% when either an amino or carboxyl group was substituted for the ortho hydroxyl, such as, e. g. in the case of o-amino benzoic acid and phthalic acid. When the second reactive group was shifted from the ortho position to either the para or meta position in reference to the carboxyl, maximum life in soap decreased approximately 70% in comparison with the composition containing salicylic acid, such as, e. g., in the case of m-hydroxy benzoic acid and p-hydroxy benzoic acid.

The salicylic acid cured film not only exhibits superior soap and alkali resistance, but also improved tensile strength and flexibility as demonstrated by the following example:

EXAMPLE IV

| | Parts by wt. |
|---|---|
| Epoxy polyhydroxy polyether resin solution—40% solids in 50/50 xylol and diacetone alcohol | 70.0 |
| Butylated urea-formaldehyde resin solution—60% solids in butyl alcohol | 9.8 |
| Diacetone alcohol | 10.1 |
| Xylol | 10.1 |
| | 100.00 |
| Salicylic acid | .35 |
| | 100.35 |

The components were the same as used in Example I. The concentration of salicylic acid is equivalent to about 1% based on the resin solids. The finish cured at 300° F. for 30 minutes exhibited a tensile strength of 10,190 lbs./sq. inch and an elongation of 3.74% to the breaking point when measured at 1.3 mils thickness using a Suter tester. The same product cured at 350° F. for 30 minutes showed a tensile strength of 10,615 lbs. per sq. inch and an elongation of 4.25% to the breaking point. The same composition without salicylic acid cured at 300° F. for 30 minutes was too brittle to test, but when cured at 350° F. for 30 minutes, the tensile strength was 6,975 lbs./sq. inch and the elongation was 2.50% to the breaking point for a 1.5 mil film. The above results pertain to the dry film. It will be noted that the higher curing temperature (350° F.) for the composition containing the salicylic acid showed no significant increase in tensile strength and per cent elongation. A similar comparison was obtained for water soaked films. The cured films showed significantly greater retention of tensile strength and elongation between the dry film and the film in water soaked condition. Compositions of this type are of particular value as adhesives for use in the manufacture of sheet abrasives.

The examples show a preferred epoxy polyhydroxy polyether resin, but other species of resin derived from condensation of a bis-phenol with a halohydrin, to form esterifiable linear polymers propagated through ether linkages and having epoxide groups and a plurality of hydroxyl groups, as the only reactive groups may be used. These resins contain either one or two epoxide groups as terminal groups of the polymer and consequently the epoxide content of the resin decreases with increasing molecular weight and conversely the epoxide equivalent increases. Commercially available resins have an epoxide equivalent ranging from about 450 to 3000. The hydroxyl groups are secondary hydroxyls distributed substantially uniformly along the linear molecule. Since the hydroxyls appear in the repeated unit of the polymer, an increase in the molecular weight reflects only a minor change in the hydroxyl content. Commercial esterifiable epoxy polyether resins useful for coating purposes generally have an esterification equivalent weight ranging from about 130 to 200. Esters derived by reacting these esterifiable polyethers resins with fatty oil acids, such as, e. g., linseed oil acids, coconut oil acids, castor oil acids, dehydrated castor oil acids, and soya oil acids may be substituted wholly or in part for the unmodified polyether resins employed in the coating composition of this invention.

Other nitrogen resins such as melamine/formaldehyde resins and n-propanol modified urea-formaldehyde resins may be substituted in part or entirely for the butylated urea-formaldehyde resin shown in the examples. These resins are themselves crosslinking agents for the epoxy polyether resin and generally constitute only a minor proportion of the resinous vehicle. The examples show a preferred concentration of urea-formeldehyde resin of about 20% based on the weight of epoxy polyether resin. The content of nitrogen resin may vary substantially, but a range of 10 to 40% on the same basis is preferred.

Plasticizers generally are not included in resinous vehicles of primer compositions where alkali and soap resistance is pertinent. Conventional plasticizers generally are monomeric esters, polyesters and alkyd resins, but these modifiers containing ester linkages are saponified under alkaline conditions and weaken the film. Plasticizers may be used where service conditions permit sacrifice in chemical resistance.

The volatile solvent portion of the coating composition may vary widely. Ketones, such as methyl ethyl ketone, acetone and methyl isobutyl ketone, ester solvents, such as, e. g. ethyl acetate, butyl acetate and amyl acetate, and aromatic hydrocarbon diluents, such as, e. g. toluene, and high solvency petroleum naphthas may be used.

Inorganic pigments, organic pigments, dyes, and fillers which are used to color conventional coating compositions may be used in the coating compositions of this invention and the pigment to binder ratio may be varied considerably. However, preferred primer compositions have a pigment to binder ratio in the range of about 35 to 65 parts of pigment for each 100 parts of binder.

The curing agent is preferably used at a concentration in the range of 1 to 5% based on the resin content of the vehicle. However, a concentration as low as 0.5% is effective. No practical advantage was observed in extending the curing agent concentration beyond 10.0%. Although the examples show the addition of the salicylic acid type curing agent to preformed coating compositions, the addition is not limited to this procedure. The curing agent may be added to the vehicle at any stage of the manufacture and it may be added dry or in the form of a solution in an organic solvent. The reactivity of the curing agents, useful in this invention, is dormant at normal atmospheric temperatures and becomes activated at some threshold curing temperature substantially above atmospheric temperature and which is specific for each curing agent. The melting point of the curing agent appears to have a bearing on the threshold curing temperature and, in the practice of this invention, it is preferred to use a curing temperature corresponding to the melting point of the curing agent or higher. Acetyl salicylic acid, the lowest melting curing agent of this invention, has a melting point of about 275° F. and, therefore, it is preferred to cure the finish at a temperature of at least 275° F. for about 30 minutes, preferably in the range of 275–300° F.

The improved compositions of this invention are primarily designed for use as primers for the protection of domestic laundry equipment. A preferred top-coat composition was described above as being comprised of a coconut oil modified alkyd resin and melamine/formaldehyde resin. The top-coat is not limited to this combination. Alkyd resin finishes, alkyd resin/urea-formaldehyde resin coatings and vinyl resin finishes may be applied over the primer. The protection of the substrate resides in the primer unless the top-coats are equally chemically resistant. The top-coat is applied over the primer to obtain properties other than alkali-resistance such as, e. g. whiteness, abrasion-resistance, flexibility, non-yellowing and chip resistance.

The improved coating compositions of this invention constitute a distinct advance in the art of coating laundry equipment which is subject to severe service conditions. These compositions are cured, generally within a period of 15 to 60 minutes, at temperatures in the range of 250 to 325° F., yielding chemical resistivity equivalent to the results obtained by curing at 400° F. for 15 minutes in the absence of a curing agent. The coating compositions of this invention which are curable at moderate temperatures provide for considerable economy through elimination of high temperature baking without sacrifice in quality. While the advantages of this invention are realized by curing the primer composition within the range of 250–325° F. for at least 15 minutes, it is to be pointed out that the curing can be carried out at temperatures as high as 400° F. or higher but there is no appreciable advantage to be gained by the higher curing temperatures.

The cured compositions of this invention are characterized by increased tensile strength and elongation over the product cured in the absence of a curing agent. This improvement in toughness and flexibility makes these compositions useful for adhesive purposes, such as, for example, as an adhesive for bonding abrasive grits to a flexible substrate. These compositions are also useful as protective and decorative top-coat finishes in addition to their primary usefulness as soap and alkali-resistant primers. For example, the compositions of this invention may be applied to a "Masonite" substrate in the manufacture of wall tile.

It is apparent that this invention may be extended to uses beyond those specifically described and that many widely different embodiments can be made without departing from the spirit and scope thereof. Therefore, it

I claim:

1. A coating composition comprising (1) the resinous condensation product of 2,2',diphenylol propane and a halohydrin, (2) an amine resin selected from the group consisting of butylated urea/formaldehyde resins, melamine formaldehyde resins, and n-propanol modified urea/formaldehyde resins, and (3) a substituted benzoic acid curing agent selected from the group consisting of salicylic acid, 5-choloro salicylic acid and acetyl salicylic acid.

2. The coating composition of claim 1 in which the resinous condensation product is partially esterified with a fatty oil acid.

3. The coating composition of claim 1 in which the curing agent is present in an amount of about 0.5 to 10.0% based on the combined weight of said resins.

4. The coating composition of claim 1 in which the amine resin is present in an amount corresponding to 10 to 40 parts per 100 parts of the resinous condensation product of 2,2',diphenylol propane and a halohydrin, on a weight basis.

5. The coating composition of claim 1 in which the halohydrin is epichlorohydrin.

6. An adhesive composition, particularly adapted for bonding abrasive grits in the manufacture of sheet abrasives comprising (1) the resinous condensation product of 2,2',diphenylol propane and epichlorohydrin, (2) butylated urea/formaldehyde resin, and (3) a substituted benzoic acid selected from the group consisting of salicylic acid, 5-chloro salicylic acid and acetyl salicylic acid, and a volatile solvent for said resins.

7. A substrate having an alkali-resistant finish deposited from a coating composition comprising (1) the resinous condensation product of 2,2',diphenylol propane and a halohydrin, (2) an amine resin selected from the group consisting of butylated urea/formaldehyde resins, melamine/formaldehyde resins, and n-propanol modified urea/formaldehyde resins, and (3) a substituted benzoic acid curing agent selected from the group consisting of salicylic acid, 5-chloro salicylic acid, and acetyl salicylic acid, said curing agent being present in an amount of about 0.5% to 10.0%, based on the combined weight of said resins, said coating having been cured at a temperature of at least 250° F for a period of at least 15 minutes.

8. The product of claim 7 in which a second coating comprising a coconut oil modified glyceryl phthalate alkyd resin and a urea/formaldehyde resin is applied as a top-coat to the alkali-resistant coating.

9. The product of claim 7 in which the substrate is a metallic substrate.

10. The product of claim 7 in which the amine resin is present in an amount corresponding to 10 to 40 parts for 100 parts of the resinous condensation product of 2,2',diphenylol propane and a halohydrin, on a weight basis.

11. A method of producing an alkali-resistant finish which comprises preparing a coating composition comprising (1) the resinous condensation product of 2,2',diphenylol propane and a halohydrin, (2) an amine resin selected from the group consisting of butylated urea/formaldehyde resins, melamine/formaldehyde resins, and n-propanol modified urea/formaldehyde resins, and (3) a substituted benzoic acid curing agent selected from the group consisting of salicylic acid, 5-chloro salicylic acid, and acetyl salicylic acid, and (4) a volatile organic solvent, said substituted benzoic acid being present within the range of 0.5% to 10.0% based on the combined weight of said resins, applying said composition in the form of a coating to a substrate, and heating said coated substrate to evaporate the solvent, further heating the substrate for at least 15 minutes at a temperature not less than 250° F.

12. The method of claim 11 in which the halohydrin is epichlorohydrin.

13. The method of claim 11 in which the amine resin is present in an amount corresponding to 10 to 40 parts per 100 parts of the resinous condensation product of 2,2',diphenylol propane and a halohydrin.

14. The method of claim 11 in which the substrate is a metallic substrate.

References Cited in the file of this patent

UNITED STATES PATENTS

| | | |
|---|---|---|
| 2,458,796 | Ott et al. | Jan. 11, 1949 |
| 2,528,360 | Greenlee | Oct. 31, 1950 |
| 2,591,539 | Greenlee | Apr. 1, 1952 |
| 2,631,138 | Dannenberg | Mar. 10, 1953 |

OTHER REFERENCES

Ellis, The Chemistry of Synthetic Resins, volume 1, pages 608–612, Reinhold, N. Y.

UNITED STATES PATENT OFFICE

CERTIFICATE OF CORRECTION

Patent No. 2,703,765　　　　　　　　　　　　　　March 8, 1955

Le Verne Kenneth Osdal

It is hereby certified that error appears in the printed specification of the above numbered patent requiring correction and that the said Letters Patent should read as corrected below.

Column 2, line 77, for "thas it" read --that is--; column 3, line 28, for "1.5" read --15--; line 29, for "in butyl" read --of butyl--; line 39, for "162° F." read --160° F.--.

Signed and sealed this 5th day of April, 1955.

(SEAL)
Attest:

E. J. MURRY
Attesting Officer

ROBERT C. WATSON
Commissioner of Patents